(12) United States Patent
Couillard

(10) Patent No.: US 8,770,849 B2
(45) Date of Patent: Jul. 8, 2014

(54) PIVOTING BALL BEARING SYSTEM

(75) Inventor: Cal Couillard, Edgerton, WI (US)

(73) Assignee: Componex, Inc., Edgerton, WI (US)

( * ) Notice: Subject to any disclaimer, the term of this patent is extended or adjusted under 35 U.S.C. 154(b) by 46 days.

(21) Appl. No.: 13/458,605

(22) Filed: Apr. 27, 2012

(65) Prior Publication Data
US 2012/0275739 A1    Nov. 1, 2012

Related U.S. Application Data

(60) Provisional application No. 61/479,916, filed on Apr. 28, 2011.

(51) Int. Cl.
F16C 23/04    (2006.01)
F16C 23/08    (2006.01)
F16C 33/58    (2006.01)

(52) U.S. Cl.
USPC ............................ 384/496; 384/497; 384/513

(58) Field of Classification Search
USPC .......................... 384/496, 497, 513, 515, 558
See application file for complete search history.

(56) References Cited

U.S. PATENT DOCUMENTS

| | | | | |
|---|---|---|---|---|
| 637,204 A * | 11/1899 | Heath | ........................... | 384/497 |
| 768,574 A * | 8/1904 | Rice | .............................. | 384/497 |
| 2,259,881 A * | 10/1941 | Foley | ............................. | 384/497 |
| 4,093,324 A * | 6/1978 | Carrigan | ...................... | 384/480 |
| 4,382,639 A * | 5/1983 | McGuffie | ..................... | 384/615 |
| 5,002,406 A * | 3/1991 | Morton et al. | ................ | 384/477 |
| 5,553,965 A * | 9/1996 | Fuss et al. | .................... | 403/291 |
| 6,599,020 B2 * | 7/2003 | Obara | .......................... | 384/480 |
| 7,422,373 B2 * | 9/2008 | Cook | ............................ | 384/486 |

* cited by examiner

*Primary Examiner* — Alan B Waits
(74) *Attorney, Agent, or Firm* — Joseph T. Leone, Esq.; Daniel A. Blasiole; DeWitt Ross & Stevens S.C.

(57) ABSTRACT

A pivoting ball bearing. The ball bearing includes a first race and a second race and one or more rows of balls disposed therebetween. The first race includes a groove configured to have at least one row of balls track therein at a continuously variable circumferential tracking path while the first race rotates with respect to the second race. Pivoting of the first race with respect to the second race can occur by the balls shifting their circumferential tracking path within the groove of the first race. A collar on either the first race or the second race limits pivoting of the first race with respect to the second race.

20 Claims, 3 Drawing Sheets

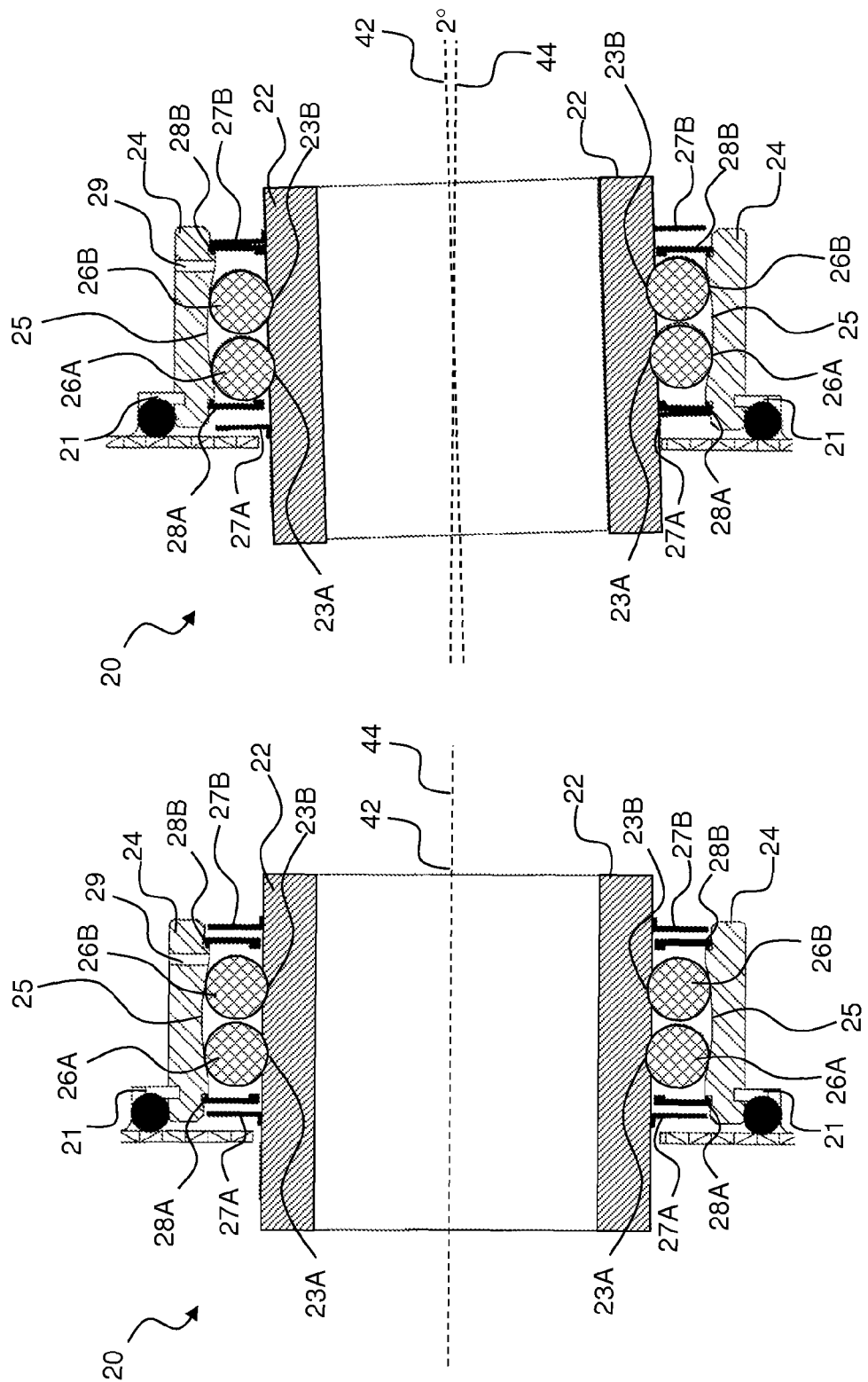

PIVOTING BALL BEARING SYSTEM

CROSS-REFERENCE TO RELATED APPLICATIONS

This application claims priority under 35 USC §119(e) to U.S. Provisional Patent Application 61/479,916 filed Apr. 28, 2011, the entirety of which is incorporated herein by reference.

FIELD OF THE INVENTION

The invention generally relates to ball bearing systems and specifically relates to pivoting ball bearing systems.

BACKGROUND

Conventional ball bearings typically include an outer race, an inner race, and balls interposed between the outer and inner races in a configuration that permits each race to rotate about a rotational axis. Conventional ball bearings are pivotally fixed such that the rotational axis of the outer race is collinear with the rotational axis of the inner race. Pivoting of the outer race with respect to the inner race, i.e., angling of the rotational axis of the outer race with respect to the rotational axis of the inner race, cannot occur without damaging the bearing. While the pivotal rigidity of conventional ball bearings is beneficial for many applications, it can also be limiting.

SUMMARY OF THE INVENTION

The present invention is directed to ball bearing systems that permit pivoting between races without damaging the ball bearing.

One version includes a ball bearing system comprising a first race having a first circumferential surface and a first groove spanning a circumference of the first circumferential surface, a second race having a second circumferential surface and at least one second groove spanning a circumference of the second circumference surface, and at least one row of balls disposed between the first race and the second race. The first groove is configured to have one of the at least one row of balls track therein at a continuously variable circumferential tracking path. Each of the at least one second groove is configured to have the one of the at least one row of balls track therein at a single circumferential tracking path. The first race defines a first rotational axis, the second race defines a second rotational axis, and pivoting of the first rotational axis with respect to the second rotational axis is accompanied by a compensating shift in tracking path of the at least one row of balls within the first race.

In preferred versions, the first groove has a width greater than a distance spanning the at least one second groove, the groove of the first race has a radius of curvature substantially greater than a radius of curvature of the balls tracking therein, and/or the at least one second groove has a radius of curvature substantially equal to a radius of curvature of the balls tracking therein.

In some versions, the first race is an outer race, and the first circumferential surface is an inwardly facing circumferential surface. In addition, the second race is an inner race, and the second circumferential surface is an outwardly facing circumferential surface.

In other versions, the first race is an inner race, and the first circumferential surface is an outwardly facing circumferential surface. In addition, the second race is an outer race, and the second circumferential surface is an inwardly facing circumferential surface.

The ball bearing preferably further includes at least one collar extending from a race toward an opposing race, wherein the race is selected from the group consisting of the first race and the second race. If the race is the first race the opposing race is the second race, and if the race is the second race the opposing race is the first race. The collar is configured to limit pivoting of the first rotational axis with respect to the second rotational axis at a predefined angle by contacting the opposing race or component connected thereto when the first rotational axis is pivoted with respect to the second rotational axis at the predefined angle.

In preferred versions, the collar defines a gap between itself and the opposing race when the first rotational axis and the second rotational axis are co-aligned. The collar preferably spans an entire circumference of a surface selected from the group consisting of the first circumferential surface and the second circumferential surface. The collar may comprise a continuous extension spanning an entire circumference of the surface. Alternatively, the collar may comprise individual extensions periodically disposed about an entire circumference of the surface. In some versions, the collar spans only a portion of a circumference of the surface. In one version, the collar limits pivoting of the first rotational axis with respect to the second rotational axis to an angle between about 0.25° and 5°.

Some versions further comprise at least one shield spanning an entire circumference of a surface selected from the group consisting of the first circumferential surface and the second circumferential surface, wherein the at least one collar, the at least one shield, and the at least one row of balls do not contact each other or the row of balls when the first rotational axis and the second rotational axis are co-aligned and also when the first rotational axis and the second rotational axis are angled at a maximum angle permitted by the at least one collar.

Some versions further comprise at least one shield spanning an entire circumference of a surface and extending toward an opposing surface. The surface is selected from the group consisting of the first circumferential surface and the second circumferential surface. If the surface is the first circumferential surface, the opposing surface is the second circumferential surface. If the surface is the second circumferential surface, the opposing surface is the first circumferential surface. At least one shield defines a gap between itself and the opposing surface when the first rotational axis and the second rotational axis are co-aligned and also when the first rotational axis and the second rotational axis are angled at a maximum angle permitted by the at least one collar.

Some versions comprise a first shield spanning the circumferential surface of the first race and a second shield spanning the circumferential surface of the second race. The first and second shields are both disposed beside one of two sides of the at least one row of balls. The first shield defines a gap between itself and the second race when the first rotational axis and the second rotational axis are co-aligned and also when the first rotational axis and the second rotational axis are angled at a maximum angle permitted by the at least one collar. The second shield defines a gap between itself and the first race when the first rotational axis and the second rotational axis are co-aligned and also when the first rotational axis and the second rotational axis are angled at a maximum angle permitted by the at least one collar.

In a specific version of the invention, the at least one second groove comprises two parallel grooves spanning the circumference of the second circumferential surface, and the at least one row of balls comprises two rows of balls. The first groove is configured to have both of the two rows of balls track therein at continuously variable circumferential tracking paths, and each of the two parallel grooves is configured to have each of the two rows of balls track therein at a single circumferential tracking path. The two parallel grooves are preferably mutually offset so that balls in a first of the two parallel grooves do not touch balls in a second of the two parallel grooves. The first groove preferably has a width greater than a distance spanning the two parallel grooves. In this version, pivoting of the first rotational axis with respect to the second rotational axis is accompanied by a compensating shift in tracking paths of each of the two rows of balls within the groove of the first race.

In some versions, the ball bearing system further comprises a ball spring plunger configured to insert within a connecting race selected from the group consisting of the first race or the second race and to exert a pressure on a device intended to be rotated. The pressure is sufficient to substantially prevent rotation between the device and the connecting race while allowing linear movement of the device through the connecting race.

The system may also further comprise a floating end and fixed end, wherein the device comprises an inner axle, the floating end comprises the connecting race, and the fixed end comprises a ball bearing linearly fixed to the inner axle.

The objects and advantages of the invention will appear more fully from the following detailed description of the preferred embodiment of the invention made in conjunction with the accompanying drawings.

BRIEF DESCRIPTION OF THE DRAWINGS

FIG. 1A depicts a side elevation cutaway view of a pivoting ball bearing of the present invention in a neutral position (i.e., with the rotational axes of the respective races in collinear alignment).

FIG. 1B depicts a side elevation cutaway view of a pivoting ball bearing of the present invention with the respective races pivoted with respect to each other at 2°.

DETAILED DESCRIPTION OF THE INVENTION

Figure 2:
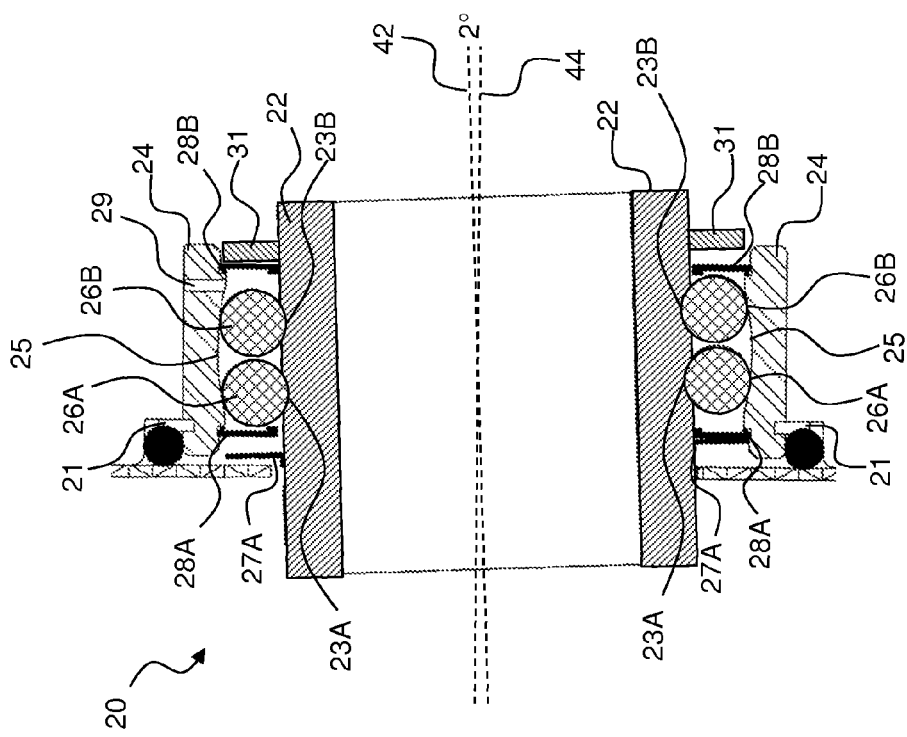
FIG. 2 depicts a side elevation cutaway view of a pivoting ball bearing of the present invention comprising a collar.

The present invention is directed to bearings 20 that permit both rotating and pivoting of an outer race 24 with respect to an inner race 22. "Rotation" and grammatical variants thereof refer to movement of a first race with respect to a second race about a rotational axis. As shown in FIGS. 1-2, for example, inner race 22 rotates with respect to outer race 24 about rotational axis 42, and outer race 24 rotates with respect to inner race 22 about rotational axis 44. "Pivoting" and grammatical variants thereof refer to angling of the rotational axis of a first race with respect to the rotational axis of a second race. As shown in FIG. 1A, for example, inner race 22 is in a neutral position (e.g. concentric alignment) with respect to outer race 24 when the respective rotational axes 42,44 are collinear. As shown in FIGS. 1B and 2, by contrast, inner race 22 is pivoted with respect to outer race 24 when the respective rotational axes 42,44 are angled with respect to each other.

Exemplary bearings 20 of the present invention are shown in FIGS. 1A-2. The bearings 20 each include an inner race 22 and an outer race 24. The inner race 22 and the outer race 24 each comprise a circumferential surface disposed about a rotational axis 42,44, with the inner race 22 comprising an outwardly facing surface and the outer race 24 comprising an inwardly facing surface. In the exemplary bearings 20, the inner race 22 and the outer race 24 both have substantially circumferential surfaces generally defining cylindrical shapes. However, other configurations, such as circumferential surfaces generally defining cone or other shapes, are possible.

The exemplary ball bearings 20 have two rows of balls 26A,26B disposed between and in contact with the outwardly facing surface of the inner race 22 and the inwardly facing surface of the outer race 24. The balls 26A,26B facilitate rotation of the inner race 22 with respect to the outer race 24. Each row of balls 26A,26B preferably includes a sufficient number of balls to span the circumference of the outwardly facing surface of the inner race 22 and the circumference of the inwardly facing surface of the outer race 24 without touching other balls within the same row.

In the exemplary ball bearings 20, the inner race 22 defines two parallel grooves 23A,23B spanning the circumference of the outwardly facing surface of the inner race 22. Each groove 23A,23B defined by the inner race 22 is configured to have one of the two rows of balls 26A,26B track therein as the inner race 22 rotates with respect to the outer race 24. Each groove 23A,23B defines a single tracking path in which each row of balls 26A,26B contacts the outwardly facing surface of the inner race 22 while the inner race 22 rotates with respect to the outer race 24. Each groove 23A,23B preferably defines a perpendicular path with respect to the rotational axis 42. The grooves 23A,23B are preferably mutually offset to that the balls 26A in the first groove 23A do not contact the balls 26B in the second groove 23B. The grooves 23A,23B may take a variety of configurations provided that they each define a single tracking path for the balls 26A,26B. In a preferred version of the invention, each groove 23A,23B comprises a rounded, concave indentation in the outwardly facing surface and further comprises a radius of curvature substantially equal to the radius of curvature of the balls 26A,26B tracking therein. Other configurations, including a pair of rails that extend from the surface, V-shaped indentations in the surface, U-shaped indentations in the surface, and squared indentations in the surface, among others, are suitable.

The outer race 24, by contrast, defines only one groove 25 spanning the circumference of its inwardly facing surface. The groove 25 has a width greater than the distance spanning the placement of the grooves 23A,23B on the opposing surface. The groove 25 is configured to have both rows of balls 26A,26B track therein as the inner race 22 rotates with respect to the outer race 24. The groove 25 preferably permits the balls 26A,26B to track at continuously variable tracking paths within the groove 25 as the inner race 22 rotates and pivots with respect to the outer race 24. A preferred configuration of the groove 25 of the outer race 24 includes a rounded, concave shape with a radius of curvature substantially greater than the radius of curvature of the balls 26A,26B tracking therein.

A ball bearing 20 with the structure and elements as described above permits pivoting of the inner race 22 with respect to the outer race 24 without damaging the ball bearing 20. Such pivoting is depicted in FIGS. 1A and 1B. FIG. 1A shows a ball bearing 20 with the inner race 22 and the outer race 24 concentrically aligned and, therefore, with rotational axes 42,44 aligned in a collinear manner. In this neutral position, each row of balls 26A,26B tracks in a path on either side of the deepest part of the groove 25 in a shallower region thereof.

FIG. 1B shows the same ball bearing 20 with the inner race 22 pivoted with respect to the outer race 24. The pivoting is reflected in the rotational axis 42 of the inner race 22 being offset at a 2° angle with respect to the rotational axis 44 of the outer race 24. The ball bearing 20 accommodates the pivoting by the two rows of balls 26A,26B taking a different tracking path within the groove 25 defined by the outer race 24 while maintaining the same tracking path in the grooves 23A,23B defined by the inner race 22. Specifically, balls 26A,26B closest to a portion of the ball bearing 20 in which the distance between the races 24,26 increases tracks away from a deeper part of the groove 25 and toward a shallower part of the groove 25 to compensate for the increased distance between the races 24,26 in that particular portion. Conversely, balls 26A,26B closest to a portion of the ball bearing 20 in which the distance between the races 24,26 decreases tracks toward a deeper part of the groove 25 and away from a shallower part of the groove 25 to compensate for the decreased distance between the races 24,26 on that particular side. This shift in tracking paths results in side-to-side movement of the balls 26A,26B with respect to the outer race 24 as they track about the circumference of the inwardly facing surface while maintaining a single path about the circumference of the outwardly facing surface of the inner race 22 (i.e., within each groove 23A,23B). The shift in tracking paths upon pivoting is shown in FIG. 1B wherein the tracking paths of the balls 26A,26B on the top portion of the depicted bearing 20 shift from right to left with respect to the outer race 24, and the tracking paths of the balls 26A,26B on the bottom portion of the depicted bearing 20 shift from left to right with respect to the outer race 24. Even in this pivoted position, each race 22,24 can rotate with respect to the other race about its own rotational axis 42,44.

As described above, the exemplary bearings 20 shown in FIGS. 1A-2 include two parallel grooves 23A,23B defined in the inner race 22 a single groove 25 defined in the outer race 24. A suitable variation comprises a ball bearing with the opposite configuration, i.e., in which the inner race defines a single groove on its outwardly facing surface and the outer race comprises two parallel grooves in its inwardly facing surface. The configurations and functioning of the elements and bearing as a whole in such a variation are identical to the exemplary bearing 20 except for the opposite placement of the respective grooves.

Yet other variations include only one row of balls disposed between the outer race 24 and the inner race 22. In such a version, a single grove in the surface of one race provides a single circumferential tracking path for the single row of balls in the manner described above for either of groves 23A or 23B. A single groove in the surface of an opposed race is configured to have the single row of balls track therein at continuously variable circumferential tracking paths, preferably by being a rounded groove having a radius of curvature substantially greater than the radius of curvature of the balls tracking therein. A bearing comprising two rows of balls, however, is preferred as it provides for a stronger bearing upon pivoting.

Some versions of the invention comprise a rigid collar that limits pivoting of the inner race 22 with respect to the outer race 24. The collar 31 limits the degree to which the inner race 22 pivots with respect to the outer race 24 by contacting the opposing race or a component connected thereto and "bottoming-out" at a pre-defined angle. An exemplary version is shown in FIG. 2, wherein a collar 31 is disposed on the inner race 22 and spans its entire circumference. In other versions, a collar 31 is disposed on the outer race 24. In yet other versions, a collar 31 is disposed on each of the inner race 22 and the outer race 24. The collar 31 may span the entire circumference of a race 22,24 or may be span only a portion thereof. Collars 31 spanning the entire circumference of a race 22,24 are preferred in bearings 20 contained in devices in which pivoting in all degrees of freedom can be expected. Collars 31 spanning only a portion of the circumference of a race 22,24 may be included in bearings 20 in devices in which pivoting in only certain directions is expected. The collar 31 in such versions is accordingly placed on a race 22,24 in fixed relation to the anticipated pivoting and is placed on a portion of the race 22,24 aligned with the direction of anticipated pivoting to oppose and limit pivoting in that direction. In versions in which the collar 31 spans the entire circumference of a race 22,24, the collar 31 may comprise a continuous extension from the race 22,24. Alternatively, the collar 31 may comprise individual extensions periodically disposed about the circumference of the race. In versions in which the collar 31 spans only a portion of the circumference of a race 22,24, the collar 31 may include one or more discontinuous extensions from the race 22,24.

The collar 31 may be configured to limit pivoting of the bearing 20 at an angle between respective rotational axes 42,44 of no greater than about 0.25°, 0.5°, 0.75°, 1°, 1.25°, 1.5°, 1.75°, 2°, 2.5°, 3°, 3.5°, 4°, 4.5°, 5° or more. The collar 31 is preferably configured to limit pivoting of the bearing 20 at an angle between respective rotational axes 42,44 between about 0.25° and 5°, more preferably between about 0.5° and 4°, and most preferably between about 1° and 3°. The collar 31 is preferably a steel collar. However, other hard, rigid materials are also suitable. In some versions of the invention, as shown in FIG. 2, a collar is disposed on only one side of the rows of balls 26A,26B. In other versions of the invention, a collar is disposed on both sides of the rows of balls 26A,26B. The collar 31 is preferably disposed on the race at a position such that the collar 31 contacts only the surface of the opposing race without contacting any other part of the race or the balls 26A,26B between the races, whether in a neutral or pivoted position.

In some versions of the invention, the ball bearing 20 may comprise one or more shields 27A,27B,28A,28B to protect the rows of balls 26A,26B from dust or other contaminants. The shield 27A,27B,28A,28B is an extension from the surface of a race that spans the circumference of the surface. The shield 27A,27B,28A,28B preferably extends toward but does not contact the opposing race when the bearing 20 is in a neutral position (i.e., the axes of rotation 42,44 are in alignment), thereby defining a gap between itself and the opposing race. Each shield 27A,27B,28A,28B also preferably defines a gap between itself and any neighboring element, such as another shield 27A,27B,28A,28B, a collar 31, or balls 26A, 26B, when in a neutral position. Such a configuration permits free rotation and a certain degree of pivoting of the inner race 22 with respect to the outer race 24 without undue friction or destruction of the shield 27A,27B,28A,28B. The shields 27A, 27B,28A,28B may be made of a flexible material such as a plastic or rubber or may also be made of a rigid material such as a metal. A difference between a collar 31 and a shield 27A,27B,28A,28B is that the collar 31 has a rigidity and strength to limit pivoting of the bearing 20, whereas the shield 27A,27B,28A,28B does not.

The exemplary versions of the bearing 20 shown in FIGS. 1A and 1B include shields 27A,27B,28A,28B extending alongside each side of the rows of balls 26A,26B from each of the inwardly facing surface of the outer race 24 and the outwardly facing surface of the inner race 22. In the exemplary versions, the shields 27A,27B extending from the inner race 22 are disposed in an exterior position with respect to the shields 28A,28B extending from the outer race 24. However, the relative positions of these shields may be reversed, wherein the shields 27A,27B extending from the inner race 22 are disposed in an interior position with respect to the shields 28A,28B extending from the outer race 24. Furthermore, the bearing 20 may include only shields 27A,27B extending from the inner race 22 or only shields 28A,28B extending from the outer race 24. The shown version with two sets of shields 27A,27B,28A,28B on either side of the balls 26A,26B and extending from opposing surfaces is preferred as it provides the greatest protection from contamination.

In some versions of the bearings 20, the shields 27A,27B, 28A,28B may be included with one or more collars 31. In other versions, one or more of the shields 27A,27B,28A,28B may be replaced by one or more collars 31. Such a version is shown in FIG. 2, wherein a collar 31 is included in place of a shield 27B. Inclusion of a collar 31 with one or more shields 27A,27B,28A,28B helps to protect the shields 27A,27B,28A, 28B from being damaged during pivoting. When a collar 31 is included with shields 27A,27B,28A,28B, the shields 27A, 27B,28A,28B are preferably positioned and configured not to contact the opposing race, even when the bearing 20 is in a maximally pivoted position allowed by the collar 31. Each shield 27A,27B,28A,28B also still preferably defines a gap between itself and any neighboring element, such as another shield, a collar 31, or balls 26A,26B, when the bearing 20 is in a maximally pivoted position allowed by the collar 31. In other versions, however, a shield 27A,27B,28A,28B may be configured to contact neighboring elements when pivoted, particularly if they are comprised of a flexible material.

As shown in FIGS. 1A-2, the exemplary ball bearings 20 further comprise a lubrication port 29 and a connecting flange 21. The lubrication port 29 comprises a hole through the outer race 24 that provides for injection of oil or grease. The connecting flange 21 provides for connecting the outer race 24 to devices intended to be rotated with respect to the inner race 22, such as an outer axle 44 (see FIG. 3). The connecting flange 21 preferably comprises an extension from a surface on a side of the outer race 24 opposite the inwardly facing face thereof. The connecting flange 21 is preferably continuously extends in a circumferential manner from the outer race 24, but it may also include individual extensions periodically placed about the circumference of the outer race 24. Other mechanisms or elements for connecting the outer race 24 to devices intended to be rotated with respect to the inner race 22, or for connecting the inner race 22 to devices intended to be rotated with respect to the outer race 24, are acceptable.

Figure 3:
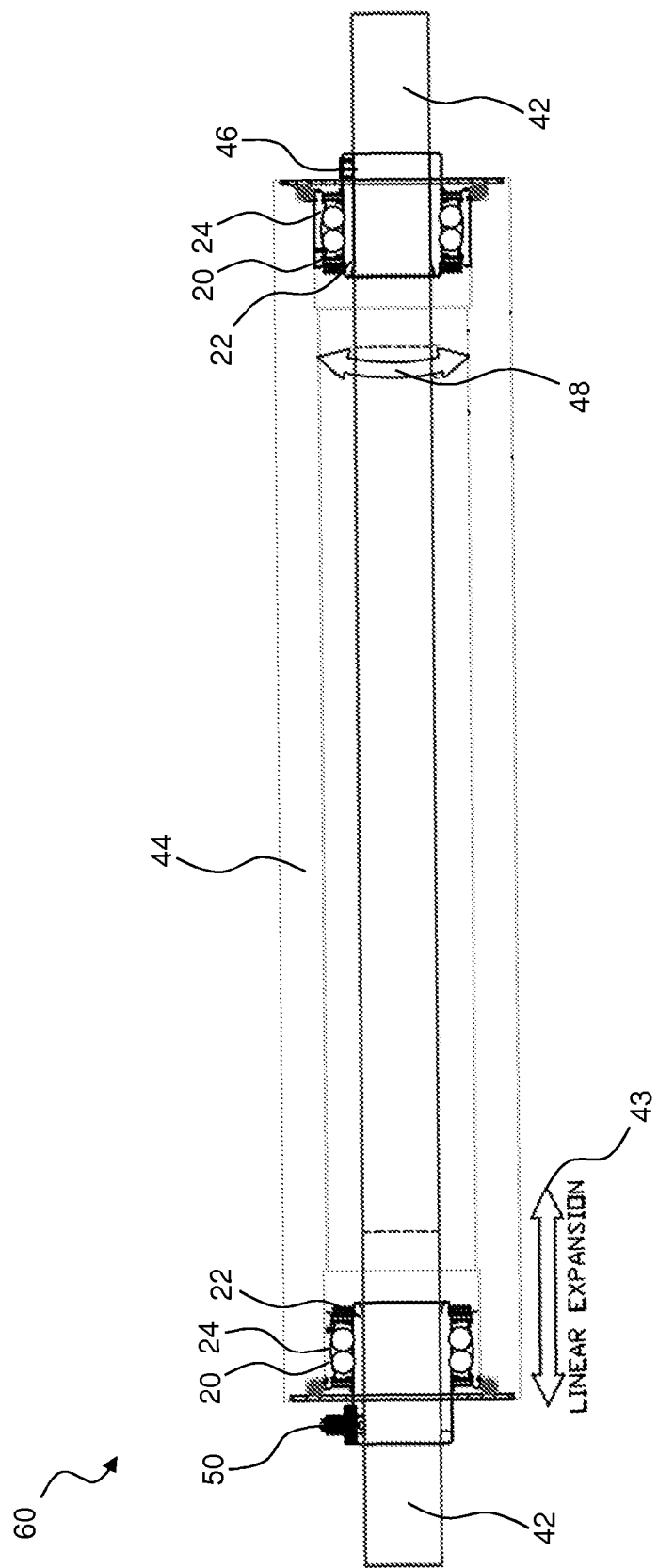
FIG. 3 depicts a side elevation cutaway view of an exemplary rotational system of the present invention that comprises pivoting ball bearings of the present invention.

The bearings 20 may include at least one of several types of fasteners for attaching the races to devices to be rotated. One type of fastener is a set screw 46. As shown in FIG. 3, the set screw 46 connects the inner race 22 to an inner axle 42, the latter of which is intended to be rotated with respect to the outer race 24 and the attached outer axle 44. The set screw 46 may comprise outer threads that mate with inner threads bored into the inner race 22, such that the set screw 46 can be screwed into the inner race 22 to exert a pressure on a surface of the inner axle 42 and fix the inner race 22 with respect thereto. In some versions, the inner axle 42 may also have inner threads that mate with the outer threads of the set screw 46 so that the set screw 46 can screw through both the inner race 22 and the inner axle 42. The inner axle 42 may also or additionally have an indentation configured to accept the set screw 46 therein.

Figure 4:
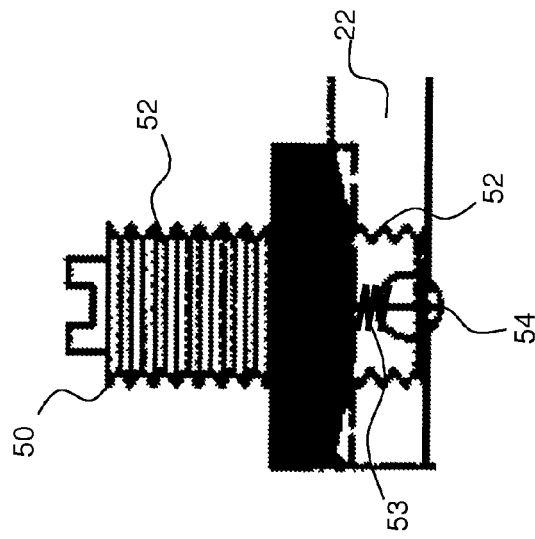
FIG. 4 depicts a side elevation view of a ball spring plunger for use as a fastener for the pivoting ball bearing of the present invention.

Another type of fastener is a ball spring plunger 50, which is shown in FIGS. 3 and 4. The exemplary ball spring plunger 50 shown in FIG. 4 includes a threaded portion 52 and a spring 53-loaded ball 54 extending from one of two ends. The threaded portion 52 screws into complimentary threads in the inner race 22 to a position such that only the spring 53-loaded ball 54 contacts and exerts pressure on the inner axle 42. The pressure of the spring 53-loaded ball 54 secures the inner race 22 to the inner axle 42 to prevent rotation therebetween during normal usage while still providing some linear movement to accommodate linear expansion and contraction 43 of the inner axle 42 due to heat or misalignment. The inner axle 42 may comprise one or more indentations to accept the spring 53-loaded ball 54 therein.

The bearings 20 described herein can be paired and employed in various rotational systems 60. As shown in FIG. 3, a bearing 20 with a ball spring plunger 50 as a fastener is paired with a bearing 20 with a set screw 46 as a fastener. The fasteners connect the inner races 22 of the bearings 20 to an inner axle 42. The outer races 24 are connected to an outer axle 44, in part, via the connecting flange 21. The bearing 20 fastened to the inner axle 42 with the set screw 46 constitutes a fixed end of the rotational system 60, wherein the inner axle 42, bearing 20, and outer axle 44 are in fixed relation linearly (but not pivotally). The bearing 20 fastened to the inner axle 42 with the ball spring plunger 50 constitutes a floating end of the rotational system 60, wherein the inner axle 42 can move linearly with respect to the bearing 20. Bowing 48 of the inner axle 42 is accommodated by pivoting of the inner race 22 with respect to the outer race 44, and linear expansion and contraction 43 is accommodated by linear movement of the inner axle 42 with respect to both the inner race 22 and the bearing 20 as a whole at the floating end. If bearings 20 with collars 31 are used, the collars 31 help prevent damage to the inner axle 42 and the bearing 20 due to bowing 48.

In some versions, the rotational system 60 may include two fixed ends, with each bearing 20 being fastened with a set screw 46. In other versions, the rotational system 60 may include two floating ends, with each bearing 20 being fastened with a ball spring plunger 50.

In the exemplary rotational system 60, the inner axle 42 comprises a single linear axle extending through both bearings 20. In alternative versions, the inner axle 42 comprises two stub shafts (each ending at the dotted lines shown in FIG. 3), with each stub shaft extending through one of the two respective bearings 20. Bowing 48 (or pivoting) of each of the stub shafts can be independently accommodated by the bearings 20.

The elements and method steps described herein can be used in any combination whether explicitly described or not.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference to the same extent as if each individual reference were specifically and individually indicated as being incorporated by reference. In case of conflict between the present disclosure and the incorporated references, the present disclosure controls.

It is understood that the invention is not confined to the particular construction and arrangement of parts herein illustrated and described, but embraces such modified forms thereof as come within the scope of the following claims.

I claim:

1. A pivoting ball bearing system comprising:
a first race having a first circumferential surface and a first groove spanning a circumference of the first circumferential surface;
a second race having a second circumferential surface and at least one second groove spanning a circumference of the second circumferential surface;
at least one row of balls disposed between the first race and the second race;
a ball spring plunger configured to connect one of the first race or the second race to a device by exerting a pressure on the device sufficient to substantially prevent rotation of the device with respect to the one of the first race or the second race and permit rotation of the device and the one of the first race or the second race with respect to an other of the first race or the second race, wherein the other of the first race or the second race is not the one of first race or the second race; and
at least one collar extending from a race toward an opposing race, wherein the race is selected from the group consisting of the first race and the second race, wherein if the race is the first race the opposing race is the second race, and if the race is the second race the opposing race is the first race, wherein:
the first groove is configured to have one of the at least one row of balls track therein at a continuously variable circumferential tracking path;
each of the at least one second groove is configured to have the one of the at least one row of balls track therein at a single circumferential tracking path;
the first race defines a first rotational axis, the second race defines a second rotational axis, and pivoting of the first rotational axis with respect to the second rotational axis is accompanied by a compensating shift in tracking path of the at least one row of balls within the first race; and
the collar is configured to limit pivoting of the first rotational axis with respect to the second rotational axis at a predefined angle by contacting the opposing race or component connected thereto when the first rotational axis is pivoted with respect to the second rotational axis at the predefined angle.

2. The system of claim 1 wherein:
the at least one second groove comprises two parallel grooves spanning the circumference of the second circumferential surface;
the at least one row of balls comprises two rows of balls;
the first groove is configured to have both of the two rows of balls track therein at continuously variable circumferential tracking paths;
each of the two parallel grooves is configured to have one of the two rows of balls track therein at the single circumferential tracking path; and
pivoting of the first rotational axis with respect to the second rotational axis is accompanied by a compensating shift in tracking paths of each of the two rows of balls within the groove of the first race.

3. The system of claim 2 wherein the first groove has a width greater than a distance spanning the two parallel grooves and wherein the two parallel grooves are mutually offset so that balls in a first of the two parallel grooves do not touch balls in a second of the two parallel grooves.

4. The system of claim 1 wherein the first groove has a width greater than a distance spanning the at least one second groove.

5. The system of claim 1 wherein the groove of the first race has a radius of curvature substantially greater than a radius of curvature of the balls tracking therein and the at least one second groove has a radius of curvature substantially equal to a radius of curvature of the balls tracking therein.

6. The system of claim 1 wherein the first race is an outer race and the first circumferential surface is an inwardly facing circumferential surface, and wherein the second race is an inner race and the second circumferential surface is an outwardly facing circumferential surface.

7. The system of claim 1 wherein the first race is an inner race and the first circumferential surface is an outwardly facing circumferential surface, and wherein the second race is an outer race and the second circumferential surface is an inwardly facing circumferential surface.

8. The system of claim 1 wherein the collar defines a gap between itself and the opposing race when the first rotational axis and the second rotational axis are co-aligned.

9. The system of claim 1 wherein the collar spans an entire circumference of a surface selected from the group consisting of the first circumferential surface and the second circumferential surface.

10. The system of claim 1 wherein the collar comprises a continuous extension spanning an entire circumference of a surface selected from the group consisting of the first circumferential surface and the second circumferential surface.

11. The system of claim 1 wherein the collar limits pivoting of the first rotational axis with respect to the second rotational axis to an angle between about 0.25° and 5°.

12. The system of claim 1 further comprising at least one shield spanning an entire circumference of a surface selected from the group consisting of the first circumferential surface and the second circumferential surface, wherein the at least one collar, the at least one shield, and the at least one row of balls do not contact each other or the row of balls when the first rotational axis and the second rotational axis are co-aligned and also when the first rotational axis and the second rotational axis are angled at a maximum angle permitted by the at least one collar.

13. The system of claim 1 further comprising at least one shield spanning an entire circumference of a surface and extending toward an opposing surface, wherein the surface is selected from the group consisting of the first circumferential surface and the second circumferential surface, wherein if the surface is the first circumferential surface the opposing surface is the second circumferential surface, and if the surface is the second circumferential surface the opposing surface is the first circumferential surface, wherein the at least one shield defines a gap between itself and the opposing surface when the first rotational axis and the second rotational axis are co-aligned and also when the first rotational axis and the second rotational axis are angled at a maximum angle permitted by the at least one collar.

14. The system of claim 1 wherein the device comprises an axle comprising a first portion and a second portion, wherein the ball spring plunger connects the one of the first race or the second race to the first portion of the axle, and further comprising:
a third race having a third circumferential surface;
a fourth race having a fourth circumferential surface; and at least one row of balls disposed between the third race and the fourth race, wherein one of the third race or the fourth race is connected to the axle at the second portion of the axle to permit rotation of the axle and the one of the third race or the fourth race with respect to an other of the third race or the fourth race, wherein the other of the third race or the fourth race is not the one of third race or the fourth race.

15. The system of claim 14 wherein the one of the third race or the fourth race is longitudinally fixed with respect to the axle, and the one of the first race or the second race is longitudinally movable with respect to the axle.

16. The system of claim 14 further comprising:
at least one second collar extending from either the third race or the fourth race toward a second opposing race, wherein if the at least one second collar extends from the third race, the second opposing race is the fourth race, and if the at least one second collar extends from the fourth race, the second opposing race is the third race, wherein:
the third race comprises a third groove spanning a circumference of the third circumferential surface;
the fourth race comprises at least one fourth groove spanning a circumference of the fourth circumferential surface;
the third groove is configured to have one of the at least one row of balls disposed between the third race and the fourth race track therein at a continuously variable circumferential tracking path;
each of the at least one fourth groove is configured to have the one of the at least one row of balls disposed between the third race and the fourth race track therein at a single circumferential tracking path;
the third race defines a third rotational axis, the fourth race defines a fourth rotational axis, and pivoting of the third rotational axis with respect to the fourth rotational axis is accompanied by a compensating shift in tracking path within the third race of the at least one row of balls disposed between the third race and the fourth race; and
the second collar is configured to limit pivoting of the third rotational axis with respect to the fourth rotational axis at a predefined angle by contacting the second opposing race or component connected thereto when the third rotational axis is pivoted with respect to the fourth rotational axis at the predefined angle.

17. The system of claim 1 further comprising:
a first axle, a second axle, and a third axle, the third axle comprising a first portion and a second portion;
a third race having a third circumferential surface;
a fourth race having a fourth circumferential surface; and
at least one row of balls disposed between the third race and the fourth race, wherein:
the device comprises the first axle;
the other of the first race or the second race is connected to the first portion of the third axle to permit rotation of the other of the first race or the second race and the third axle with respect to the one of the first race or the second race and the first axle;
one of the third race or the fourth race is connected to the second axle to permit rotation of the one of the third race or the fourth race and the second axle with respect to an other of the third race or the fourth race, wherein the other of the third race or the fourth race is not the one of the third race or the fourth race; and
the other of the third race or the fourth race is connected to the second portion of the third axle to permit rotation of the other of the third race or the fourth race and the third axle with respect to the one of the first race or the second race and the first axle.

18. The system of claim 17 wherein the one of the third race or the fourth race is longitudinally fixed with respect to the first axle, and the one of the first race or the second race is longitudinally movable with respect to the second axle.

19. The system of claim 17 further comprising:
at least one second collar extending from either the third race or the fourth race toward a second opposing race, wherein if the at least one second collar extends from the third race, the second opposing race is the fourth race, and if the at least one second collar extends from the fourth race, the second opposing race is the third race, wherein:
the third race comprises a third groove spanning a circumference of the third circumferential surface;
the fourth race comprises at least one fourth groove spanning a circumference of the fourth circumferential surface;
the third groove is configured to have one of the at least one row of balls disposed between the third race and the fourth race track therein at a continuously variable circumferential tracking path;
each of the at least one fourth groove is configured to have the one of the at least one row of balls disposed between the third race and the fourth race track therein at a single circumferential tracking path;
the third race defines a third rotational axis, the fourth race defines a fourth rotational axis, and pivoting of the third rotational axis with respect to the fourth rotational axis is accompanied by a compensating shift in tracking path within the third race of the at least one row of balls disposed between the third race and the fourth race; and
the second collar is configured to limit pivoting of the third rotational axis with respect to the fourth rotational axis at a predefined angle by contacting the second opposing race or component connected thereto when the third rotational axis is pivoted with respect to the fourth rotational axis at the predefined angle.

20. The system of claim 1 wherein the pressure exerted by the ball spring plunger on the device permits linear movement of the one of the first race or the second race with respect to the device.

* * * * *